United States Patent Office 3,752,820
Patented Aug. 14, 1973

3,752,820
SUBSTITUTED-1,2,3,4-TETRAHYDROBENZO-
THIENO[3,2-c]PYRIDINE DERIVATIVES
John T. Suh, Mequon, Wis., assignor to Colgate-
Palmolive Company, New York, N.Y.
No Drawing. Filed Mar. 20, 1972, Ser. No. 236,228
Int. Cl. C07d 31/50
U.S. Cl. 260—294.8 B  6 Claims

ABSTRACT OF THE DISCLOSURE

Substituted - 1,2,3,4 - tetrahydrobenzothieno[3,2-c]pyridine derivatives are central nervous system depressants having antipsychotic activity. A compound disclosed is 8-chloro-1,2,3,4-tetrahydrobenzothieno[3,2-c]pyridine.

DETAILED DESCRIPTION

The compounds of the invention may be represented by the following formula:

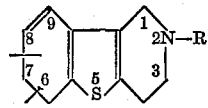

in which X and Y are selected from hydrogen, hydroxy, lower alkoxy of 1 to 4 carbons such as methoxy or ethoxy, halogen such as chloro, fluoro or bromo, and trifluoromethyl, and R is hydrogen or a lower alkyl of 1 to 4 carbon atoms.

The compounds of the invention are structurally related to the compounds disclosed in my U.S. Pats. No. 3,518,278 issued June 30, 1970, and No. 3,520,895 issued July 21, 1970. However, the compounds of the present invention are surprisingly more potent tranquilizing agents than the patented compounds.

The compounds of the present invention may be conveniently prepared from thiophenols of the formula

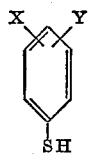

in which X and Y are as previously defined.

The thiophenols which can be employed are known compounds and include the following:

thiophenol,
p-chlorothiophenol,
m-chlorothiophenol,
o-chlorothiophenol,
p-bromothiophenol,
m-bromothiophenol,
o-bromothiophenol,
3,4-dimethoxythiophenol,
p-methoxythiophenol,
p-trifluoromethylthiophenol,
m-trifluoromethylthiophenol, and
o-trifluoromethylthiophenol.

The compounds of the invention are preferably prepared be reacting the selected thiophenol with bromoacetal in the presence of sodium and ethanol to form a phenyl-2,2-diethoxyethyl sulfide which is then reacted with a mixture of phosphoric acid and phosphorous pentoxide to form the corresponding benzothiophene or thianaphthene. The thianaphthene is then reacted first with butyl lithium and then with ethylene oxide to form the 2-(2-hydroxyethyl)-thianaphthene, which is in turn treated with thionyl chloride to form the corresponding 3-(2-chloroethyl)-thianaphthene. The 2-chloroethyl derivative is then treated with sodium iodine to form the 2-iodo-ethylthianaphthene which is refluxed with hexamethylenetetramine in chloroform to form the 1,2,3,4-tetrahydrobenzothieno[3,2-c]pyridine. The secondary amine thus obtained may be used to prepare by conventional methods the compounds in which R is other than hydrogen. The ring hydroxylated compound may be prepared from the ring methoxylated compound by conventional ether cleavage methods.

The above-described process is described in specific detail in the examples and may be illustrated as follows:

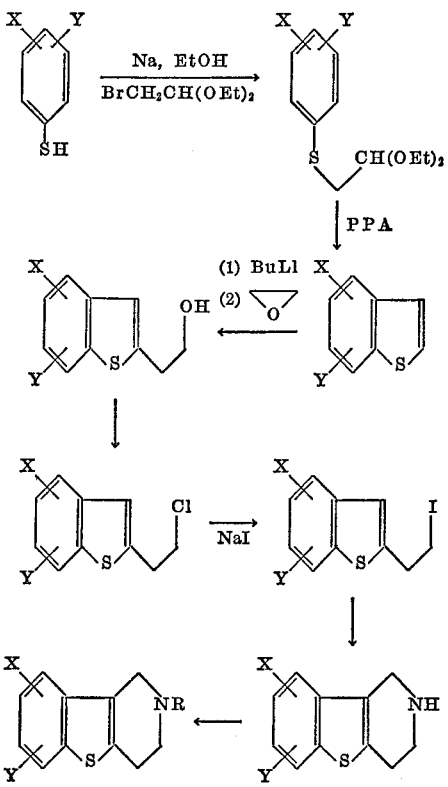

Representative of compounds which may be prepared by the described process are the following:

1,2,3,4-tetrahydrobenzothieno[3,2-c]pyridine,
6-fluoro-1,2,3,4-tetrahydrobenzothieno[3,2-c]pyridine,
7-fluoro-1,2,3,4-tetrahydrobenzothieno[3,2-c]pyridine,
9-fluoro-1,2,3,4-tetrahydrobenzothieno[3,2-c]pyridine,
8-fluoro-1,2,3,4-tetrahydrobenzothieno[3,2-c]pyridine,
6-chloro-1,2,3,4-tetrahydrobenzothieno[3,2-c]pyridine,
7-chloro-1,2,3,4-tetrahydrobenzothieno[3,2-c]pyridine,
9-chloro-1,2,3,4-tetrahydrobenzothieno[3,2-c]pyridine,
8-chloro-1,2,3,4-tetrahydrobenzothieno[3,2-c]pyridine,
8-chloro-2-methyl-1,2,3,4-tetrahydrobenzothieno[3,2-c]
   pyridine,
6-trifluoromethyl-1,2,3,4-tetrahydrobenzothieno[3,2-c]
   pyridine,
7-trifluoromethyl-1,2,3,4-tetrahydrobenzothieno[3,2-c]
   pyridine,
5-trifluoromethyl-1,2,3,4-tetrahydrobenzothieno[3,2-c]
   pyridine,
8-trifluoromethyl-1,2,3,4-tetrahydrobenzothieno[3,2-c]
   pyridine, 7,8-dimethoxy-1,2,3,4-tetrahydrobenzothieno[3,2-c] pyridine,
6-methoxy-1,2,3,4-tetrahydrobenzothieno[3,2-c]pyridine,
7-trifluoromethyl-1,2,3,4-tetrahydrobenzothieno[3,2-c] pyridine,
9-methoxy-1,2,3,4-tetrahydrobenzothieno[3,2-c]pyridine,
8-methoxy-1,2,3,4-tetrahydrobenzothieno[3,2-c]pyridine,
7-hydroxy-1,2,3,4-tetrahydrobenzothieno[3,2-c]pyridine,
8-hydroxy-1,2,3,4-tetrahydrobenzothieno[3,2-c]pyridine,
8-hydroxy-2-ethyl-1,2,3,4-tetrahydrobenzothieno[3,2-c] pyridine,
7,8-dihydroxy-1,2,3,4-tetrahydrobenzothieno[3,2-c] pyridine,
7-bromo-1,2,3,4-tetrahydrobenzothieno[3,2-c]pyridine,
8-bromo-1,2,3,4-tetrahydrobenzothieno[3,2-c]pyridine,
7-iodo-1,2,3,4-tetrahydrobenzothieno[3,2-c]pyridine, and
8-iodo-1,2,3,4-tetrahydrobenzothieno[3,2-c]pyridine.

The compounds in which R is other than hydrogen may be readily prepared by conventional methods. For example, the compounds in which R is methyl may be readily prepared by reacting the corresponding compound in which R is hydrogen with a mixture of formaldehyde and formic acid. Alternatively, such compounds, as well as compounds in which R is hydrogen, may be prepared from the corresponding β-(thianaphthen-2-yl)ethylamines in the manner described in U.S. Pat. No. 3,520,895.

Acid addition salts of the compounds of the present invention may be prepared by contacting the compounds with a suitable acid such as formic acid, citric acid, maleic acid, sulphuric acid, hydrochloric acid, succinic acid, tartaric acid, benzoic acid or fumaric acid.

The compounds of the present invention are useful as intermediates in the preparation of more complex chemical and pharmaceutical compounds. In addition, because of their antipsychotic properties, they are useful as pharmaceutical agents, per se. In animal tests the compounds have demonstrated an ability to control antisocial aggressive behavior. For example, the compound 8-chloro-1,2,3,4-tetrahydrobenzothieno[3,2-c]pyridine, which is representative of the class, has shown at a safe and effective dose of approximately 10 mg./kg. intraperitoneally a depressant as well as an antipsychiotic effect. The compound was also found to have an $LD_{50}$ in mice in excess of 100 mg./kg. intraperitoneally in behavior studies conducted in the manner outlined by Irwin in "Animal and Clinical Pharmacologic Techniques in Drug Evaluation," J. H. Nodine and P. E. Siegler, ed., Year Book Publishers, Inc., 1961, pp. 36–54.

When intended for use as pharmaceuticals, the compounds are preferably employed in the form of their acid addition salt or free base and are combined with a major amount of one or more suitable pharmaceutical diluents or additives and formed into unit dosage forms, such as capsules or tablets for oral administration, or sterile solutions for parenteral administration. The unit dosage forms will generally contain a concentration of 0.1% to 10% or more by weight of one or more of the novel compounds. Generally, such dosage forms will contain about 5 to 250 mg. of the active ingredients. One or more of such dosage forms may be administered daily; however, the amount administered will not normally exceed 100 mg./kg. of body weight of the intended recipient.

A typical tablet may have the following composition:

|   | Mg. |
|---|---|
| (1) 8 - chloro - 1,2,3,4-tetrahydrobenzothieno[3,2-c]pyridine | 20 |
| (2) Starch U.S.P. | 52 |
| (3) Lactose U.S.P. | 68 |
| (4) Talc U.S.P. | 9 |
| (5) Stearic acid | 6 |

Powders 1, 2 and 3 are slugged, then granulated, mixed with 4 and 5 and tableted.

A suitable capsule might be obtained by filling a No. 3 hard gelatin capsule with a mixture of the following ingredients:

|   | Mg. |
|---|---|
| (1) 8 - chloro - 1,2,3,4-tetrahydrobenzothieno[3,2-c]pyridine | 10 |
| (2) Lactose U.S.P. | 195 |
| (3) Starch U.S.P. | 16 |
| (4) Talc U.S.P. | 8 |

The following examples are presented to illustrate the invention:

EXAMPLE 1 p-Chlorophenyl 2,2-diethoxyethyl sulfide

To 350 ml. of absolute ethanol is added 24 g. (1.04 g. atom) of sodium metal. After most of the sodium is dissolved, 144.62 g. (1 mole) of p-chlorothiophenol is added and the stirred mixture refluxed until no sodium remains. After adding 14.9 g. (0.1 mole) of sodium iodide, the solution is cooled (ice bath) and 206 g. 1.04 mole) of bromoacetal added over a 5 minute period. The resulting stirred mixture is heated to reflux (a moderately vigorous exothermic reaction occurs during the heating) and held at reflux for 3 hours. The resulting mixture is concentrated, diluted with water, and extracted with ether. The combined ether extracts are dried over $MgSO_4$, filtered, concentrated, and distilled (B.P. 134–137° at 0.3 mm.)$^{-1}$ to give the sulfide as a clear colorless liquid.

EXAMPLE 2

5-chlorobenzothiophene

To 144 ml. of stirred 85% phosphoric acid is added portionwise 240 g. of phosphorus pentoxide. The resulting stirred mixture is heated to 170° under vacuum (5–10 mm.) and 90.0 g. (0.345 mole) of p-chlorophenyl 2,2-diethoxyethyl sulfide added gradually under the surface of the polyphosphoric acid. The crude product is distilled as formed. When about ⅔ of the sulfide has been added, the reaction mixture begins to foam and the stirring is stopped. The remaining sulfide is added with no stirring The 5-chlorobenzothiophene is collected as a pale yellow oil which solidifies on cooling in the refrigerator. A small portion is recrystallized from isopropyl alcohol to give small white needles, M.P. 37.5–38.5°.

EXAMPLE 3

5-chloro-2-(2-hydroxyethyl)-thianaphthene

To a stirred cooled (−50°) solution of 5-chlorothianaphthene (60.37 g., 357 mmoles) in 650 ml. of anhydrous ether is added over a 20 minute period 262 ml. (412 mmoles) of 1.57 M butyl lithium in hexane. The resulting yellow solution is allowed to warm to −25° and a solution of 22 g. (505 mmoles) of ethylene oxide in 50 ml. of ether is added over 7 minutes. The reaction mixture is allowed to warm slowly to −10° when an exothermic reaction starts and a thick precipitate forms. The temperature is kept below −5° by immersing in a Dry Ice-isopropanol bath. After the initial reaction subsides, the mixture is stirred at 10–15° for 1.5 hours and then cautiously quenched with dilute hydrochloric acid. The ether layer is separated, washed with water, dried over $MgSO_4$, filtered, and concentrated to leave a white solid. One recrystallization from carbon tetrachloride gives the desired alcohol as white needles, M.P. 63.5–67.5°.

Analysis.—Calcd. for $C_{10}H_9ClOS$ (percent): C, 56.48; H, 4.27; Cl, 16.68. Found (percent): C, 56.59; H, 4.00; Cl, 16.30.

EXAMPLE 4

5-chloro-3-(2-chloroethyl)-thianaphthene

To 52.46 g. (246 mmoles) of 5-chloro-2-(2-hydroxyethyl)thianaphthene is added dropwise 38 g. (320 mmoles) of thionyl chloride. After the addition is complete, the mixture is heated to 130–135° for 20 minutes and cooled. Excess thionyl chloride is removed under vacuum and the residue distilled (bulb to bulb, 130–140° at 0.2 mm.) to give a yellow oil which crystallizes rapidly on cooling. Recrystallization from n-heptane gives the ethyl chloride as white elongated rhomboids, M.P. 80–82°. An analytical sample melted at 81–82°.

*Analysis.*—Calcd. for $C_{10}H_8Cl_2S$ (percent): C, 51.96; H, 3.49; Cl, 30.68. Found (percent): C, 51.94; H, 3.14; Cl, 30.08.

EXAMPLE 5

5-chloro-2-(2-iodoethyl)-thianaphthene

A mixture of 48.52 g. (210 mmoles) of 5-chloro-2-(2-chloroethyl)-thianaphthene and 63.2 g. (422 mmoles) of sodium iodide in 200 ml. of dry acetone is refluxed for 9 hours. The mixture is concentrated and the solid residue diluted with water and extracted with warm chloroform. The combined chloroform extracts are washed with water, dried over $MgSO_4$, filtered, and concentrated to leave a white solid which is recrystallized from chloroform-n-heptane to give the iodide as white plates, M.P. 110.5–112°. An analytical sample melted at 112.5–114°.

EXAMPLE 6

8-chloro-1,2,3,4-tetrahydrobenzothieno[3,2-c]pyridine

A mixture of 12.00 g. (37.1 mmoles) of 5-chloro-2-(2-iodoethyl)-thianaphthene and 5.46 g. (39.0 mmoles) of hexamethylenetetramine in 40 ml. of chloroform is refluxed under $N_2$ for 24 hours. The resulting white precipitate is separated by filtration to give 11.24 g. (65.2%) of the hexamethylenetetramine adduct as a pale yellow powder, M.P. 170°.

A mixture of 12.11 g. (26.2 mmoles) of the above hexamethylenetetramine adduct, 7.26 ml. of concentrated HCl, and 40 ml. of ethanol is stirred at room temperature for 94 hours. The resulting brown mixture is refluxed 15 minutes and then 35 ml. of the solvent is distilled. To the residue is added 4 ml. of concentrated HCl and 17 ml. of ethanol. After refluxing for 1 hour, 22 ml. of the solvent is collected by distillation. The residue is triturated with 50 ml. of water and 100 ml. of benzene. After cooling in an ice bath, the mixture is filtered to separate a solid which is washed with benzene and dried. The solid is suspended in water, made basic with 20% sodium hydroxide, and extracted with ether. The combined ether extracts are dried, filtered, and concentrated to leave a pale yellow solid which, upon distillation (B.P. 135–140° at 0.04 mm.), gives a pale green solid. Recrystallization from ethyl acetate-n-heptane gives the analytically pure 8-chloro-1,2,3,4-tetrahydrobenzothieno[3,2-c]pyridine as white needles, M.P. 99.5–100.5°.

*Analysis.*—Calcd. for $C_{11}H_{10}ClNS$ (percent): C, 59.05; H, 4.51; N, 6.26. Found (percent): C, 59.23; H, 4.38; N, 6.08.

I claim:

1. A compound selected from compounds of the formula

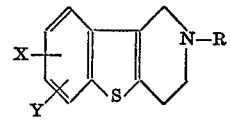

and pharmaceutically acceptable acid addition salts thereof, in which X and Y are selected from hydrogen, hydroxy, lower alkoxy of 1 to 4 carbon atoms, halogen and trifluoromethyl, and R is hydrogen or a lower alkyl of 1 to 4 carbon atoms.

2. A compound of claim 1 in which X is hydrogen or halogen.
3. A compound of claim 1 in which R is hydrogen.
4. A compound of claim 1 in which R is lower alkyl.
5. A compound of claim 1 in which X is chloro.
6. The compound of claim 1 in which X is 8-chloro and R is hydrogen.

References Cited

UNITED STATES PATENTS

| | | | |
|---|---|---|---|
| 3,518,277 | 6/1970 | Suh | 260—294.8 B |
| 3,520,895 | 7/1970 | Suh | 260—294.8 |

ALAN L. ROTMAN, Primary Examiner

U.S. Cl. X.R.

260—330.5; 424—263